United States Patent
Ando

(10) Patent No.: US 11,016,484 B2
(45) Date of Patent: May 25, 2021

(54) VEHICLE CONTROL APPARATUS AND METHOD FOR PERFORMING AUTOMATIC DRIVING CONTROL

(71) Applicant: DENSO CORPORATION, Kariya (JP)

(72) Inventor: Toshihide Ando, Kariya (JP)

(73) Assignee: DENSO CORPORATION, Kariya (JP)

(*) Notice: Subject to any disclaimer, the term of this patent is extended or adjusted under 35 U.S.C. 154(b) by 254 days.

(21) Appl. No.: 16/029,928

(22) Filed: Jul. 9, 2018

(65) Prior Publication Data

US 2019/0018410 A1    Jan. 17, 2019

(30) Foreign Application Priority Data

Jul. 11, 2017 (JP) .............................. JP2017-135690

(51) Int. Cl.
| | |
|---|---|
| *G05D 1/00* | (2006.01) |
| *G01C 21/32* | (2006.01) |
| *G06K 9/00* | (2006.01) |
| *B60W 50/14* | (2020.01) |

(52) U.S. Cl.
CPC ........... *G05D 1/0061* (2013.01); *B60W 50/14* (2013.01); *G01C 21/32* (2013.01); *G05D 1/0088* (2013.01); *G06K 9/00805* (2013.01); *B60W 2540/30* (2013.01); *G05D 2201/0213* (2013.01); *G06K 9/00798* (2013.01)

(58) Field of Classification Search
CPC ... G05D 1/0061; G05D 1/0088; B60W 50/14; G01C 21/32; G06K 9/00805
See application file for complete search history.

(56) References Cited

U.S. PATENT DOCUMENTS

| | | | | |
|---|---|---|---|---|
| 8,521,352 | B1* | 8/2013 | Ferguson | G05D 1/0274 701/25 |
| 2013/0211656 | A1* | 8/2013 | An | G05D 1/0285 701/25 |
| 2014/0156133 | A1* | 6/2014 | Cullinane | G05D 1/0223 701/23 |
| 2017/0132334 | A1* | 5/2017 | Levinson | G06F 30/20 |
| 2018/0356823 | A1* | 12/2018 | Cooper | G05D 1/0202 |

FOREIGN PATENT DOCUMENTS

| | | |
|---|---|---|
| JP | 2001-023094 A | 1/2001 |
| JP | 2014-106854 A | 6/2014 |

* cited by examiner

*Primary Examiner* — Hussein Elchanti
(74) *Attorney, Agent, or Firm* — Maschoff Brennan

(57) ABSTRACT

A vehicle control apparatus for performing automatic driving control of a vehicle carrying the apparatus based on a travel path to a destination, which path is set using map information, and detection information about surroundings of the vehicle detected by sensors mounted in the vehicle. In the vehicle control apparatus, a mismatch determiner is configured to, during automatic driving control, determine whether or not there is a match between the map information and the detection information acquired from the sensors. A control aspect changer is configured to, if it is determined by the mismatch determiner that there is a mismatch between the map information and the detection information, change a control aspect of automatic driving control in response to a situation of mismatch.

8 Claims, 11 Drawing Sheets

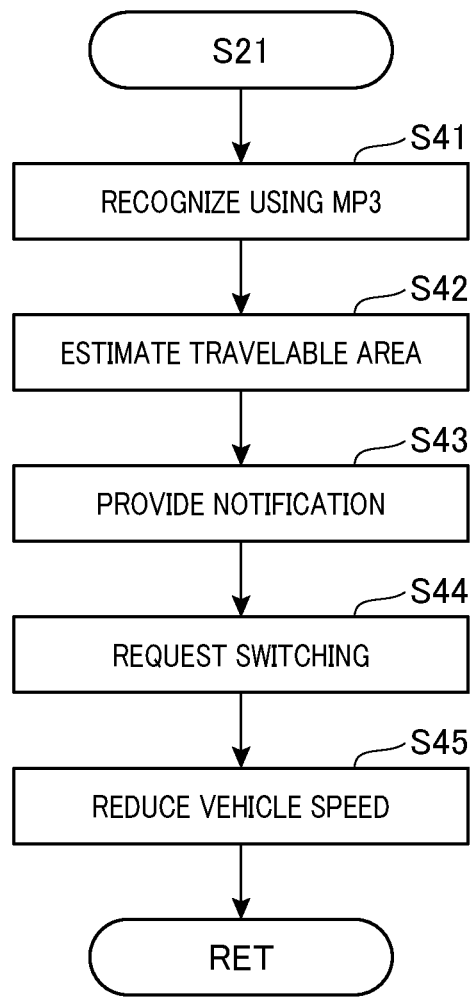

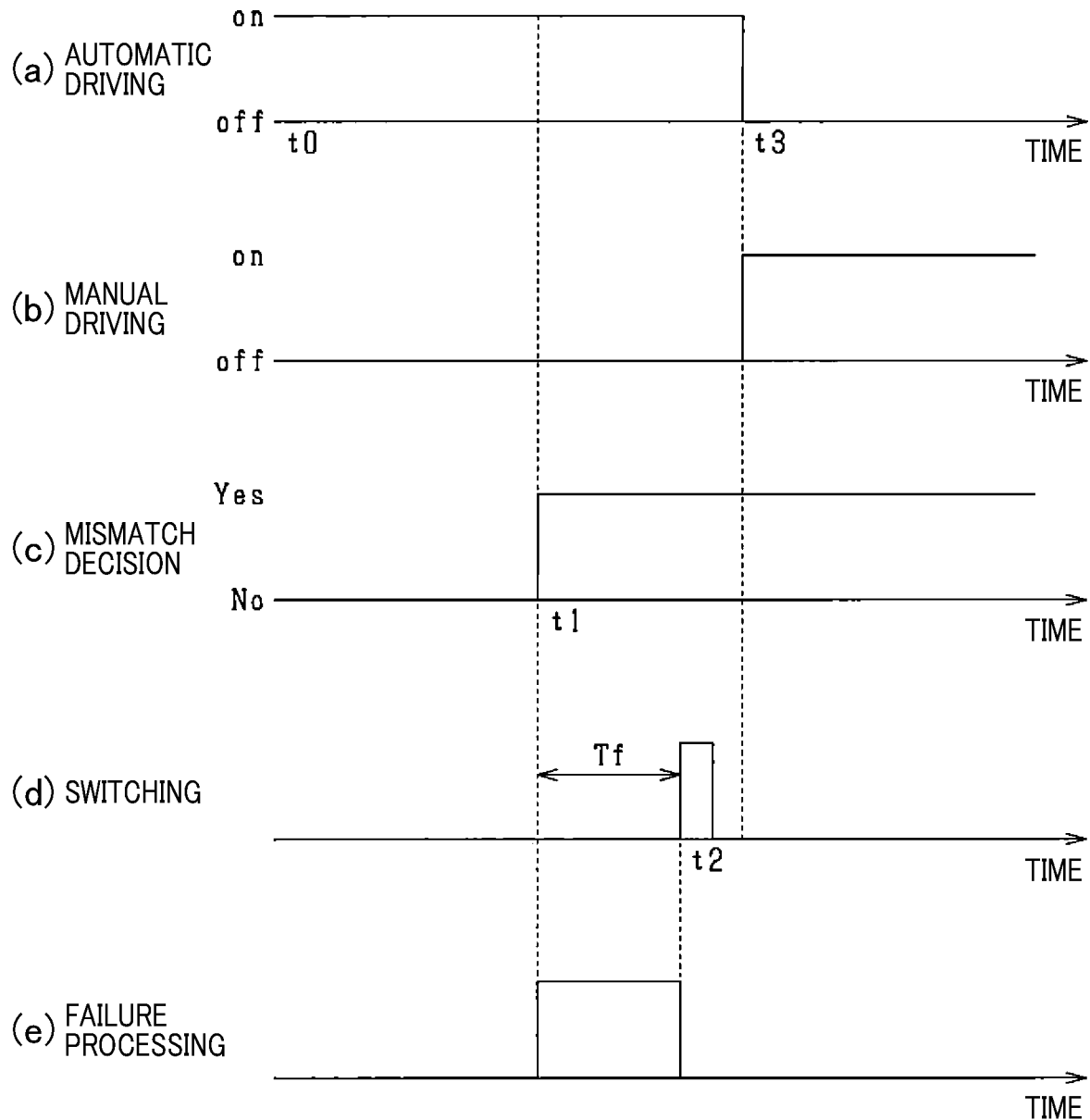

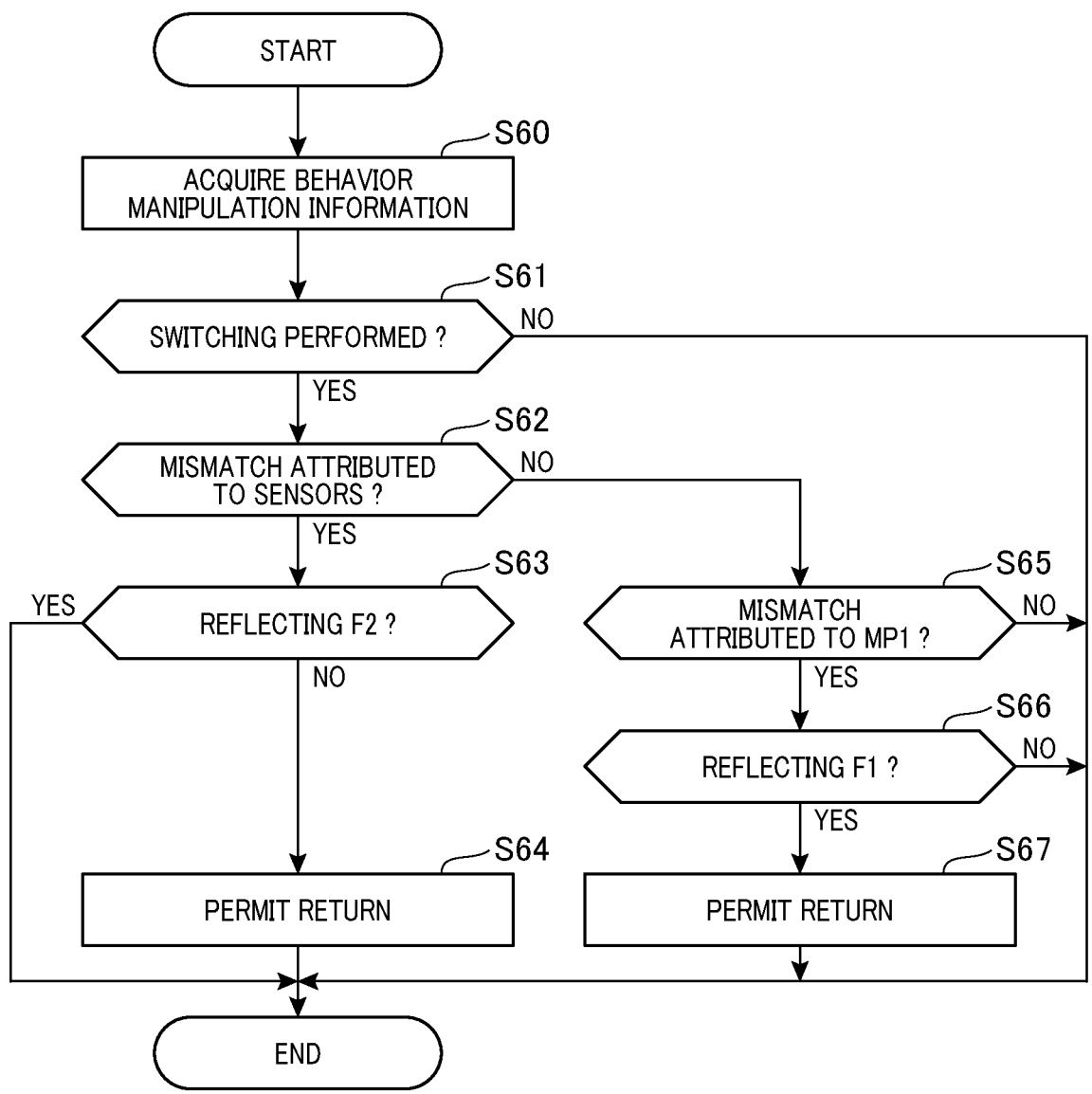

VEHICLE CONTROL APPARATUS AND METHOD FOR PERFORMING AUTOMATIC DRIVING CONTROL

CROSS-REFERENCE TO RELATED APPLICATION

This application is based on and claims the benefit of priority from earlier Japanese Patent Application No. 2017-135690 filed on Jul. 11, 2017, the description of which is incorporated herein by reference.

BACKGROUND

Technical Field

This disclosure relates to a vehicle control apparatus and method for performing automatic driving control.

Related Art

In recent years, automatic driving control for automatically controlling behaviors of a vehicle is known (see, for example, Japanese Patent Application Laid-Open Publication No. 2014-106854). To implement automatic driving control, there is a vehicle control apparatus configured to set a travel path to a destination using map information and control behaviors of a vehicle carrying the apparatus along the travel path based on detection information from an on-board sensor. The vehicle carrying the apparatus is hereinafter referred to as an own vehicle.

It may be assumed that there is a mismatch between the map information and the detection information acquired from the on-board sensor during automatic driving control performed by the vehicle control apparatus. For example, the map information may not reflect an actual road condition due to a road modification along the travel path. In addition, a failure or the like in the on-board sensors may cause the on-board sensors to falsely recognize an object. Conventionally, no measures are taken even in the event where there is a mismatch between the map information and the detection information from the on-board sensors. Thus, a driver of the own vehicle had to stop moving of the vehicle by actuating a brake of the vehicle.

In view of the above, a vehicle control apparatus and method for performing automatic driving control of a vehicle, enabling the vehicle to travel properly, are desired.

SUMMARY

In one aspect, a vehicle control apparatus for performing automatic driving control of a vehicle carrying the apparatus based on a travel path to a destination, which path is set using map information, and detection information about surroundings of the vehicle detected by sensors mounted in the vehicle. The apparatus includes: a mismatch determiner configured to, during automatic driving control, determine whether or not there is a match between the map information and the detection information acquired from the sensors; and a control aspect changer configured to, if it is determined by the mismatch determiner that there is a mismatch between the map information and the detection information, change a control aspect of automatic driving control in response to a situation of mismatch.

In the event where there is a mismatch between the map information and the detection information from the sensors, the reliability of the automatic driving control using the map information and the detection information may decrease. Thus, switching from automatic driving control to manual driving may be performed. In the above configuration, if it is determined that there is a mismatch between the map information and the detection information, a control aspect of automatic driving control is changed in response to a situation of the mismatch. With this configuration, even if there is a mismatch between the map information and the detection information from the sensors mounted in the vehicle, a control aspect of automatic driving control is changed in response to a situation of the mismatch, such that the automatic driving control can be continued, which allows for properly performing the automatic driving control of the vehicle.

BRIEF DESCRIPTION OF THE DRAWINGS

FIG. 7 is a flowchart of failure processing in accordance with the first embodiment:
FIG. 9 is a timing diagram from before to after switching from automatic driving to manual driving;
FIG. 12 is a flowchart of processing for determining a cause of mismatch during manual driving in accordance with a third embodiment.

DESCRIPTION OF SPECIFIC EMBODIMENTS

Figure 1A:
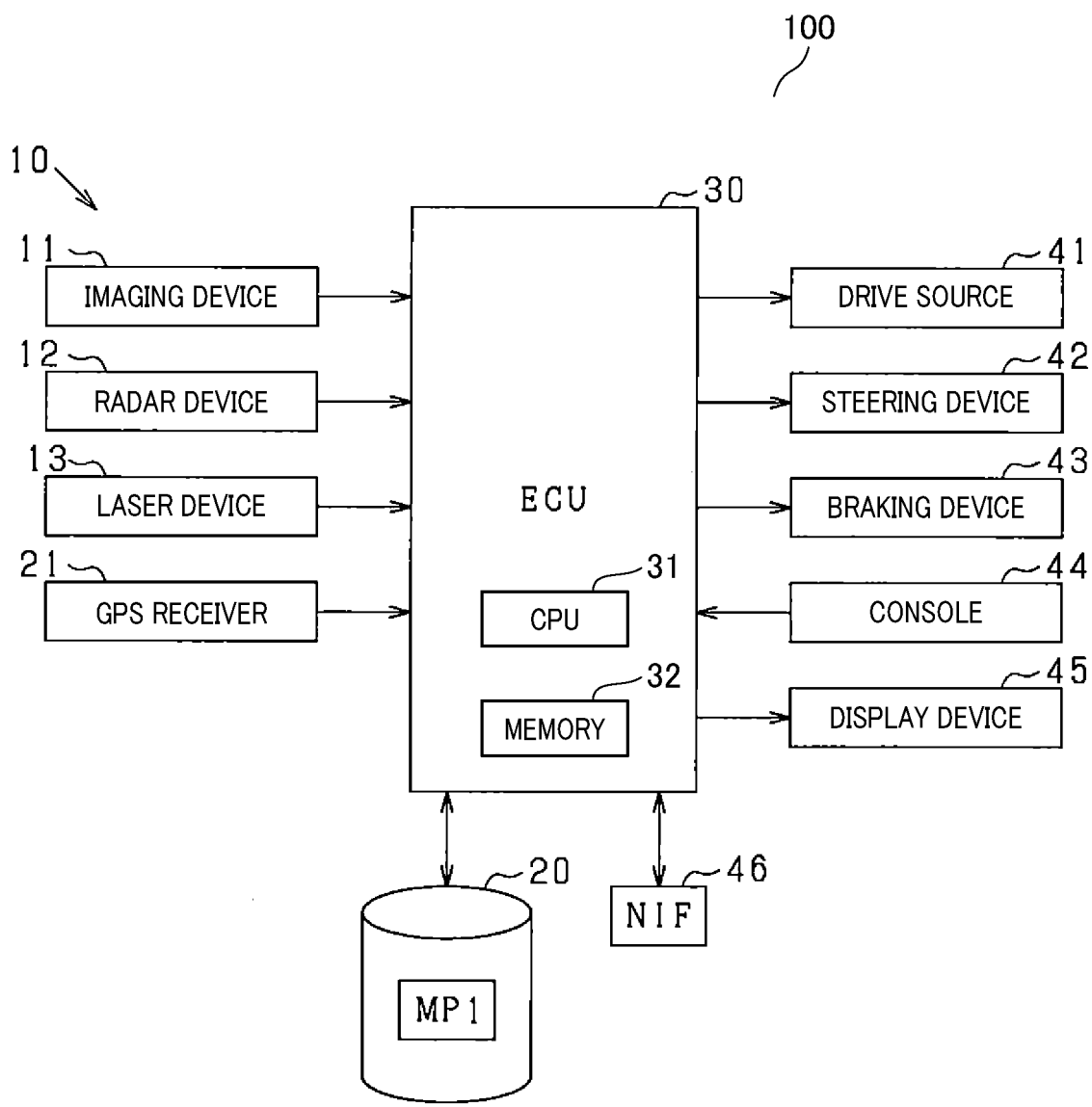
FIG. 1A is a block diagram of a vehicle control system.

Hereinafter, exemplary embodiments of the present disclosure will be described in detail with reference to the accompanying drawings, in which like reference numerals refer to like or similar elements and duplicated description thereof will be omitted.

First Embodiment

A vehicle control apparatus of the present embodiment is mounted in a vehicle and configured to perform automatic driving control of the vehicle based on an environment around the vehicle. The vehicle carrying the vehicle control apparatus is hereinafter referred to as an own vehicle. A schematic configuration of the vehicle control system of the present embodiment will now be described with reference to FIG. 1A.

The vehicle control system 100 includes on-board sensors 10, a memory 20 that records map information, a GPS receiver 21, a control electronic control unit (ECU) 30 that serves as a vehicle control apparatus, a drive source 41, a steering device 42, and a braking device 43. The ECU 30 corresponds to an apparatus for controlling the own vehicle by performing automatic driving control of the own vehicle.

The on-board sensors 10 are provided in the own vehicle to detect surroundings of the own vehicle as detection information. In the present embodiment, the on-board sensors 10 may include an imaging device 11, a radar device 12, and a laser device 13.

The imaging device 11 is an on-board camera, such as a charge-coupled device (CCD) camera, a complementary metal-oxide semiconductor (CMOS) image sensor, a near-infrared camera or the like. The imaging device 11 is operable to capture an image of surroundings of the own vehicle and sequentially output image data corresponding to the captured image to the ECU 30.

The radar device 12 is configured to transmit electromagnetic waves as transmit waves and receive their reflected waves to detect objects around the own vehicle. The radar device 12 is mounted at a front of the own vehicle and configured to, based on an amount of time from emission of electromagnetic waves to receipt of reflected waves, produce range data and sequentially output the range data to the ECU 30. The range data includes information for each detected object representing a direction, a distance and a relative speed of the detected object relative to the own vehicle.

The laser device 13 is configured to transmit laser waves as transmit waves and receive their reflected waves to detect objects around the own vehicle. The laser device 13 is configured to, based on an amount of time from emission of laser waves to receipt of reflected waves, produce range data and sequentially output the range data to the ECU 30.

The drive source 41, which is a power source for moving the own vehicle, includes an engine and/or a driving motor. The steering device 42 is configured to turn the wheels to change a travel direction of the own vehicle. The braking device 43 is configured to apply a braking force to the own vehicle.

The ECU 30 may be configured as a microcomputer including a central processing unit (CPU) 31 and a memory 32 as a collection of a read-only memory (ROM), a random-access memory (RAM) and the like. To perform automatic vehicle control, the CPU 31 outputs control signals for controlling the drive source 41, the steering device 42, and the braking device 43, with reference to computing programs and control data stored in the ROM. The ECU 30 performs processing described later through the CPU 31 executing computer programs stored in the ROM or the like.

Figure 1B:
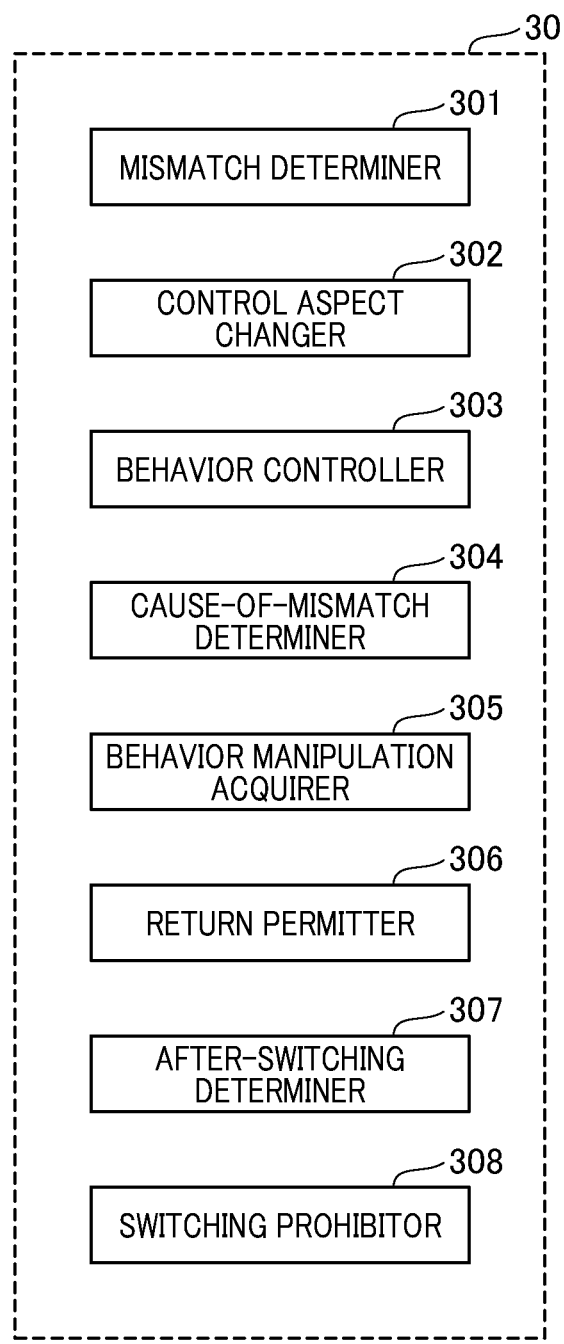
FIG. 1B is a functional block of an ECU.

Referring to FIG. 1B, the ECU 30 includes, as functional blocks, a mismatch determiner 301, a control aspect changer 302, a behavior controller 303, a cause-of-mismatch determiner 304, a behavior manipulation information acquirer 305, a return permitter 306, an after-switching determiner 307, and a switching prohibitor 308, Functions of these blocks will be described later.

The ECU 30 is configured to acquire a location and a shape of a respective one of roadways registered in map information MP1 recorded in the memory 20. For example, the map information MP1 records links and nodes, where each link represents a lane on a respective one of the roadways registered in map information MP1 and each node represents a point at which a plurality of lanes are connected. For each node, absolute coordinates on the map are recorded in the map information MP1, whereby a location of the node on the map can be detected. Use of the connection between the nodes and the links allows the ECU 30 to plan a path from a node representing a certain location to a node representing a destination as a travel path.

Roadway information and ground objects around each roadway are registered in the map information MP1. The roadway information includes information about a shape of each lane, demarcation lines that define the boundaries of each roadway, and road markings. The ground objects may include a guardrail, a curb, a traffic light, a road sign, and a roadway wall. The roadway information and ground objects registered in the map information MP1 are registered in association with location information representing their absolute positions on the map information MP1. Use of the map information MP1 allows the ECU 30 to extract the roadway information, types and locations of ground objects around the own vehicle. The ground objects registered in the map information MP1 are hereinafter denoted by F1.

The GPS receiver 21 serves as part of a well-known global navigation satellite system (GNSS) to receive radio waves from satellites as global positioning system (GPS) information. Use of the GPS information allows the ECU 30 to detect a current location of the own vehicle on the map information MP1.

The vehicle control system 100 includes a console 44 for receiving driver manipulations, and a display device 45 for displaying various information. The console 44 is provided in a passenger compartment, for example, in an instrument panel, so as to be viewable to a driver of the own vehicle. The display device 45 may also serve as a navigation device for displaying at least a roadway on which the own vehicle is traveling based on the map information MP1.

The vehicle control system 100 is connected to a network interface 46 enabling communication with an external server. In the present embodiment, the most recent map information MP1 is recorded in the external server. The ECU 30 can thus download the most recent map information MP1 recorded in the external server by communicating with the external server via the network interface 46.

The automatic driving control performed by the vehicle control system 100 will now be described. In the automatic driving control, the ECU 30 sets a travel path to a destination using the map information MP1, and based on the set travel path and detection information about surroundings of the own vehicle detected by the on-board sensors 10, controls the own vehicle.

The ECU 30 plans a travel path from the current location of the own vehicle to a destination using the map information MP1. In order to cause the own vehicle to travel along the planned travel path, the ECU 30 outputs control signals to some or all of the drive source 41, the steering device 42, the braking device 43 and the like that are subject to control.

During automated driving, the ECU 30 controls the behavior of the own vehicle using range data detected by the radar device 12 or the laser device 13 to cause the own vehicle to travel in accordance with its environment. More specifically, the ECU 30 recognizes a location of a predetermined recognition target around the own vehicle using the range data, and controls the drive source 41, the steering device 42, and the braking device 43 to control the behavior of the own vehicle in response to the recognized location. Among the ground objects, locations of which can be detected from the range data, the ECU 30 can recognize a guardrail, a curb, a roadway wall and the like, as objects used to control the behavior of the own vehicle.

In the present embodiment, the ECU 30 recognizes a recognition target around the own vehicle from measurement point information MP2 generated using the range data.

Figure 2:
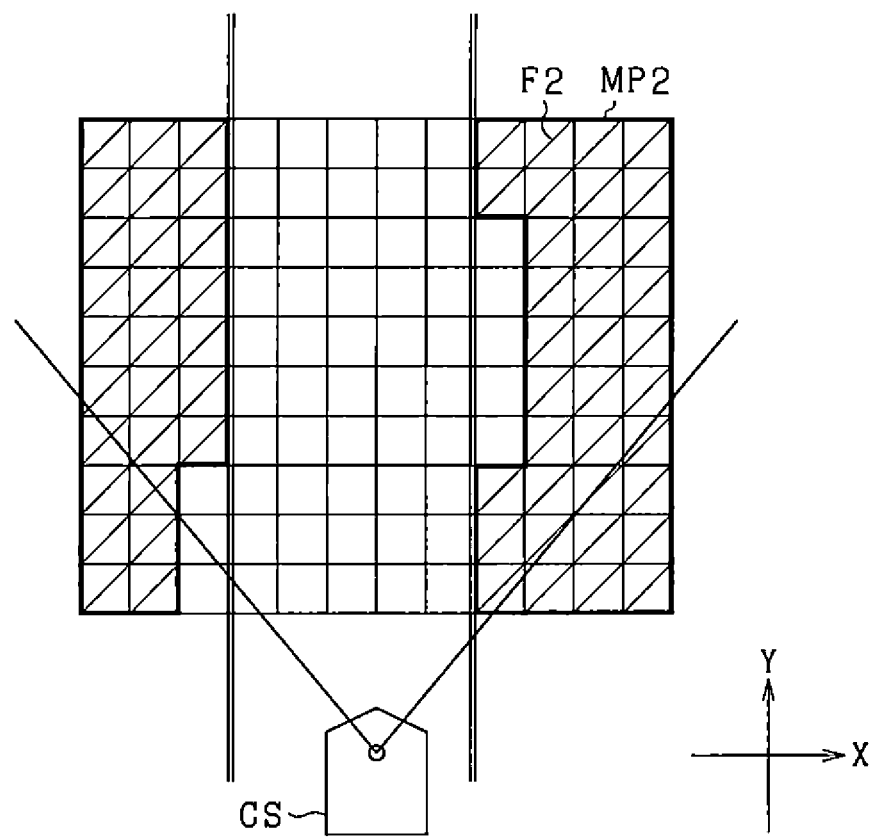
FIG. 2 is an illustration of measurement point information MP2.

FIG. 2 is an illustration of the measurement point information MP2, where the X-direction is a lateral direction and the Y-direction is a travel direction of the own vehicle.

The measurement point information MP2 represents a two-dimensional area located forward of the own vehicle CS, which is defined by the lateral direction and the travel direction. In the measurement point information MP2, the two-dimensional area is divided into a plurality of blocks arranged in a grid-like fashion. For each block corresponding to a respective one of locations indicated by the range data, an existence probability of a ground object in the block is recorded in the measurement point information MP2.

The ECU 30 recognizes a set of blocks, for each of which the existence probability is equal to or greater than a predetermined value, in the measurement point information MP2 as a recognition target. In the following, the recognition target recognized by the ECU 30 using the measurement point information MP2 is referred to as a detected ground object F2. In FIG. 2, the detected ground object F2 is an area circumscribed by a heavy line. Each time the range data is acquired, the ECU 30 increments the existence probability for each block corresponding to a respective one of locations indicated by the range data. Variations over time in the range data for a ground object are smaller than variations over time in the range data for a moving object. Therefore, based on variations over time in the range data, the ECU 30 discriminates between a ground object and a moving object, and sequentially increases the existence probability for each of blocks recognized as a ground object.

The ECU 30 estimates a travelable area based on a location of the detected ground object F2 recognized using the measurement point information MP2. More specifically, the ECU 30 estimates an area including successive blocks that have not been recognized as a detected ground object F2 as a travelable area. That is, the travelable area is an area such that the own vehicle CS is less likely to collide with a ground object on the roadway. The ECU 30 respectively controls the drive source 41, the steering device 42, and the braking device 43 to control the behavior of the own vehicle in the estimated travelable area.

In the automatic driving control set forth above, if the map information MP1 and the measurement point information MP2 do not match, the reliability of the automatic driving control using the map information MP1 and the on-board sensors 10 may decrease. For example, the map information MP1 may be different from the actual road condition due to a road modification in part of the travel path. Thus, the registered ground object F1 may not properly represent the actual circumstances surrounding the own vehicle. A failure in at least one of the on-board sensors 10 or an error in the ECU 30 may cause a recognition target to be mistakenly recognized. Also, in such a case, there may be a mismatch between the map information MP1 and the measurement point information MP2.

Figure 3:
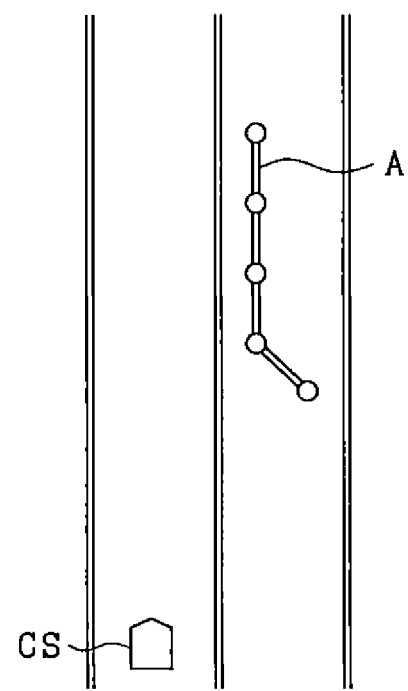
FIG. 3 is an example of a mismatch between map information MP1 and measurement point information MP2.

FIG. 3 illustrates an example of a mismatch between the map information MP1 and the measurement point information MP2. In the example of FIG. 3, traveling in an adjacent lane that is a lane adjacent to the lane in which the own vehicle is traveling was prohibited in the past due to road construction, but now traveling in the adjacent lane is permitted. The map information MP1, however, has not been updated since when traveling in the adjacent lane was prohibited. Thus, even though there is actually no guardrail A in the adjacent lane, the guardrail A remains registered in the map information MP1.

The ECU 30 is configured to plan a travel path taking into account the guardrail A registered in the information MP1. However, since there is no such guardrail A in the actual adjacent lane, the guardrail A will not be recognized as a recognition target from the measurement point information MP2 during automatic driving. In such a case, the ECU 30 may estimate the adjacent lane for which the guardrail A is registered in the map information MP1 as a travelable area for the own vehicle. That is, the own vehicle may travel in a lane for which a guardrail is displayed on a navigation image, which may cause the driver of the own vehicle to feel discomfort. This may possibly reduce the reliability of the driver on the automatic driving control. Such reduced reliability of the automatic driving control may also occur in the case where the on-board sensors 10 have detected a ground object that is not registered in the map information MP1.

In one case where there is a mismatch between the map information MP1 and the measurement point information MP2, the ECU 30 has extracted one of the registered ground object F1 and the detected ground object F2 and has not extracted the other. In another case where there is a mismatch between the map information MP1 and the measurement point information MP2, a location of the ground object F1 registered in the map information MP1 and a location of the ground object F2 recognized using the measurement point information MP2 do not match.

In cases where there is a mismatch between the map information MP1 and the measurement point information MP2, at least one of the map information MP1 and the measurement point information MP2 is likely to be incorrect. However, it is difficult for the ECU 30 to determine whether the map information MP1 or the measurement point information MP2 is correct.

In view of the foregoing, the ECU 30 is configured to determine whether or not the map information MP1 and the measurement point information MP2 do match. The ECU 30 is configured to, if it is determined the there is a mismatch between the map information MP1 and the measurement point information MP2 during automatic driving control, change a control aspect of automatic driving control in response to a situation of the mismatch.

In the present embodiment, the ECU 30 is configured to, if it is determined the there is a mismatch between the map information MP1 and the measurement point information MP2 during automatic driving control, make it easier to recognize a recognition target as compared to if it is determined that there is a match between the map information MP1 and the measurement point information MP2, thereby changing the control aspect of automatic driving control. In cases where the ECU 30 determines that there is a mismatch between the map information MP1 and the measurement point information MP2, it may be assumed that at least one of the map information MP1 and the measurement point information MP2 does not reflect actual road conditions. Therefore, to reduce a collision probability between the own vehicle and a recognition target, the ECU 30 is configured to make it easier to recognize a recognition target to thereby change a control aspect of automatic driving control.

Figure 4:
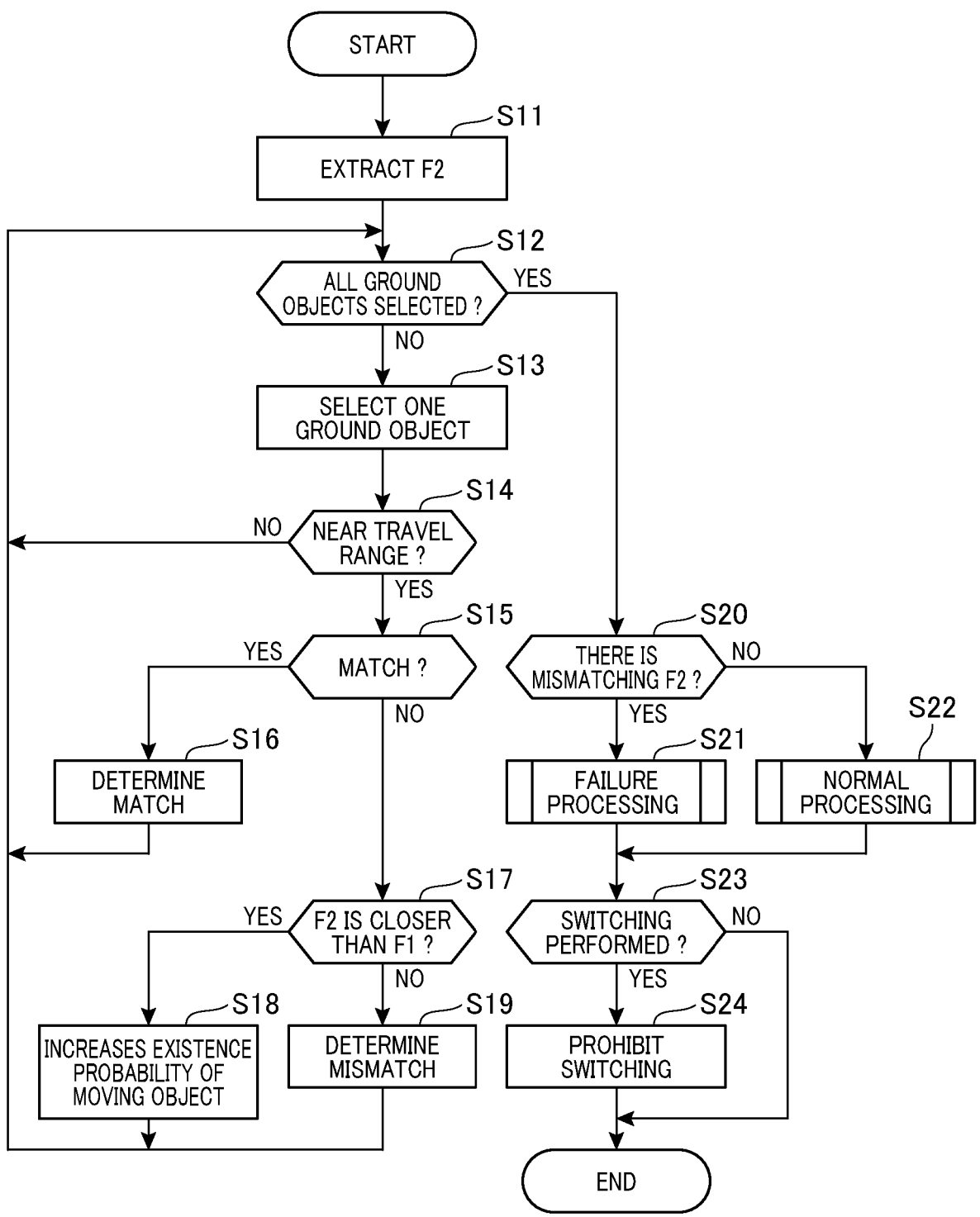
FIG. 4 is a flowchart of automatic driving control processing.

Automatic driving control performed in the ECU 30 will now be described with reference to FIG. 4. Processing shown in a flowchart of FIG. 4 is performed iteratively every predetermined time interval during performing automatic driving control. It is assumed that, before performing automatic driving control, the ECU 30 has planned a travel path using the map information MP1.

At step S11, the ECU 30 extracts detected ground objects F2 from the measurement point information MP2. In the present embodiment, the ECU 30 extracts a set of blocks, for each of which the existence probability is equal to or greater than a decision threshold, from the measurement point information MP2 as a detected ground object F2.

At step S12, the ECU 30 determines whether or not comparison has been performed between all the detected ground objects F2 extracted at step S11 and a registered ground object F1 extracted from the map information MP1. If the comparison has been performed for all the detected ground objects F2 extracted at step S11, then the process flow proceeds to step S20. If the comparison has not been yet performed for at least one of all the detected ground objects F2 extracted at step S11, then the process flow proceeds to step S13.

At step S13, the ECU 30 selects one of the detected ground objects F2 extracted at step S11, for which a determination as to whether or not there is a match between the map information MP1 and the measurement point information MP2.

At, step S14, the ECU 30 determines whether or not the detected ground object F2 selected at step S13 is located near a travel range of the own vehicle. For example, if a distance in the lateral direction X from the center of the own vehicle to the detected ground object F2 selected at step S13 is within a predetermined range, it is determined that the detected ground object F2 selected at step S13 is located near the travel range of the own vehicle. If it is determined that the detected ground object F2 selected at step S13 is not located near the travel range of the own vehicle, then the process flow returns to step S12. If it is determined that the detected ground object F2 selected at step S13 is located near the travel range of the own vehicle, then the process flow proceeds to step S15.

At step S15, the ECU 30 determines, for the detected ground object F2 selected at step S13, the extent of the match of the measurement point information MP2 with the map information MP1. More specifically, the ECU 30 determines locations of blocks where the detected ground object F2 selected at step S13 has been extracted, extracts a registered ground object F1 registered in a specific area including the determined locations, and compare a type and a location of the registered ground object F1 with a type and a location of the detected ground object F2 selected at step S13.

At step S15, the ECU 30 determines whether or not there is a match between the detected ground object F2 and the registered ground object F1. If there is a match between the detected ground object F2 and the registered ground object F1, then the process flow proceeds to step S16. If at step S15 the registered ground object F1 of the same type as the detected ground object F2 has not been extracted at the location of the detected ground object F2, determines that there is a mismatch between the detected ground object F2 and the registered ground object F1. The process flow then proceeds to step S17. In FIG. 1B, the mismatch determiner 301 is responsible for executing step S15.

At step S16, it is determined that there is a match between the detected ground object F2 selected at step S13 and the registered ground object F1. Thereafter, the process flow returns to step S12. Additionally, at step S16, a match decision flag may be set for the detected ground object F2 selected at step S13.

If at step S15 the ECU 30 determines that the registered ground object F1 of the same type as the detected ground object F2 has not been extracted at the location of the detected ground object F2, then at step S17 the ECU 30 determines whether or not the detected ground object F2 is closer to the own vehicle than the registered ground object F1. If there is a moving object closer to the own vehicle than the detected ground object F2 in the travel direction Y, the radar device 12 or the laser device 13 is likely to detect the ground object F2 and the moving object as one ground object. Therefore, if the detected ground object F2 is closer to the own vehicle than the registered ground object F1 in the travel direction Y, then the process flow proceeds to step S18.

At step S18, the ECU 30 determines that there is a moving object around the detected ground object F2. In the present embodiment, the ECU 30 assigns, to the blocks where the detected ground object F2 has been extracted, information representing a possibility that there is a moving object around the detected ground object F2. For example, the ECU 30 increases an existence probability of a moving object.

If at step S17 the ECU 30 determines that the detected ground object F2 is not closer to the own vehicle than the registered ground object F1 in the travel direction Y, the process flow proceeds to step S19. At step S19, the ECU 30 determines that there is a mismatch between the detected ground object F2 selected at step S13 and the registered ground object F1 registered in the map information MP1. Additionally, at step S19, a mismatch decision flag may be set for the detected ground object F2 selected at step S13.

If at step S12 it is determined that the comparison has been performed for all the detected ground objects F2 extracted at step S11, then the process flow proceeds to step S20. At step S20, the ECU 30 determines whether or not there is at least one of all the detected ground objects F2 extracted at step S11, for which the mismatch decision flag is set. If there is at least one of the all the detected ground objects F2, for which the mismatch decision flag is set, the process flow proceeds to step S21. At step S21, the ECU 30 makes it easier to recognize a recognition target to control the behavior of the own vehicle. If there is no detected ground object F2 for which the mismatch decision flag is set, the process flow proceeds to step S22. At step S22, the ECU 30 recognizes each of all the detected ground objects F2 as a recognition target to control the behavior of the own vehicle.

In FIG. 1B, the behavior controller 303 is responsible for execution of steps S21, S22.

Figure 5:
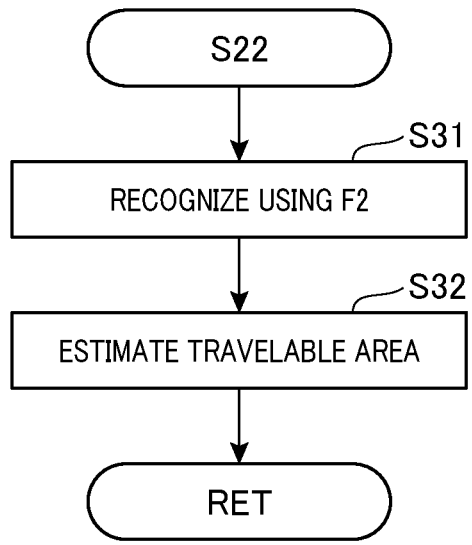
FIG. 5 is a flowchart of normal control processing in accordance with the first embodiment.

FIG. 5 illustrates a flowchart of travelable area estimation processing as normal processing performed at step S22. There is a match between the measurement point information MP2 and the map information MP1 at step S22. Therefore, at step S31, the ECU 30 recognizes a recognition target around the own vehicle from the detected ground object F2.

At step S32, the ECU 30 estimates a travelable area. In the present embodiment, the ECU 30 estimates a travelable area for the own vehicle based on a location of the detected ground object F2 recognized at step S31.

Figure 6:
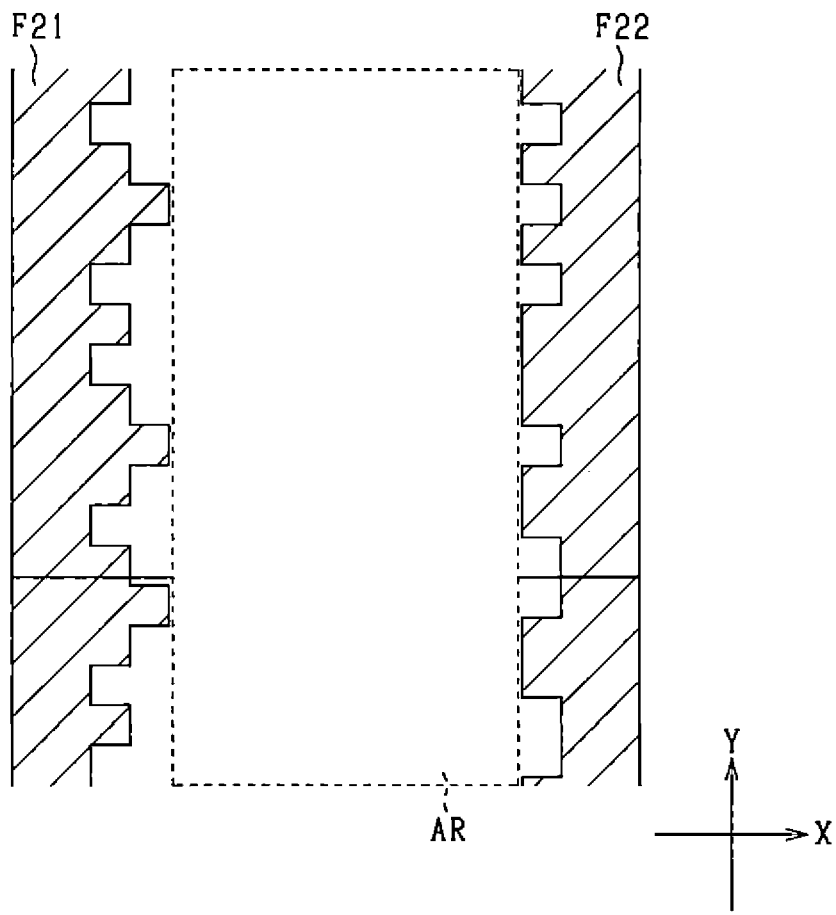
FIG. 6 is an example of travelable area estimation in the case where there is a match.

FIG. 6 illustrates estimation of a travelable area in the case where there is a match between the measurement point information MP2 and the map information MP1. Blocks where recognition targets have been extracted are indicated by hatching. The travelable area AR is circumscribed by a dashed line. In FIG. 6, there are curbs extending forward of the own vehicle in the travel direction Y. The ECU 30 has extracted these curbs as the detected ground objects F21, F22. The recognition targets are located at the blocks extracted as the detected ground objects F21, F22.

Based on the measurement point information MP2, the ECU 30 determines the set of blocks corresponding to a respective one of the recognition targets as an obstacle, thereby estimating a travelable area so as to avoid the locations of the blocks determined as an obstacle. In FIG. 6, the ECU 30 estimates an area extending in the travel direction Y between the detected ground objects F21, F22 as the travelable area AR. For example, using a well-known Kalman filter, the ECU 30 may estimate a travelable area reflecting locations of previously detected ground objects F2.

Returning to FIG. 4, the process flow proceeds to step S21 performed in the case where there is at least one detected ground object F2 for which the mismatch decision flag is set. In this case, where there is a mismatch between the map information MP1 and the measurement point information MP2, the ECU 30 makes it easier to recognize a recognition target to control the automatic driving control. In the following, an example of processing performed at step S21 is failure processing.

FIG. 7 is a flowchart of travelable area estimation processing as normal processing performed at step S21.

At step S41, the ECU 30 recognizes that there are recognition targets in a range including the map information MP1 and the measurement point information MP2. In the present embodiment, the ECU 30 fuses detected ground objects F2 extracted from the measurement point information MP2 with registered ground objects F1 extracted from the map information MP1 to generate a fusion map MP3 for recognizing recognition targets around the own vehicle. The ECU 30 recognizes recognition targets from the fusion map MP3.

The fusion map MP3 is generated by recording locations of ground objects F1, F2 that can be extracted from the map information MP1 and the measurement point information MP2, respectively. The ECU 30 uses the fusion map MP3 to recognize registered ground objects F1 and detected ground objects F2 as recognition targets around the own vehicle.

For example, in one case where the ECU 30 has extracted either one of a registered ground object F1 and a detected ground object F2 from the fusion map MP3, the ECU 30 recognizes the extracted one of the registered ground object F1 and the detected ground object F2 as a recognition target. In another case where the ECU 30 has extracted both of a registered ground object F1 and a detected ground object F2 from the fusion map MP3 with a mismatch between a location of the registered ground object F1 and a location of the detected ground object F2, the ECU 30 recognizes an area including both the registered ground object F1 and the detected ground object F2 as a recognition target.

Figure 8A:
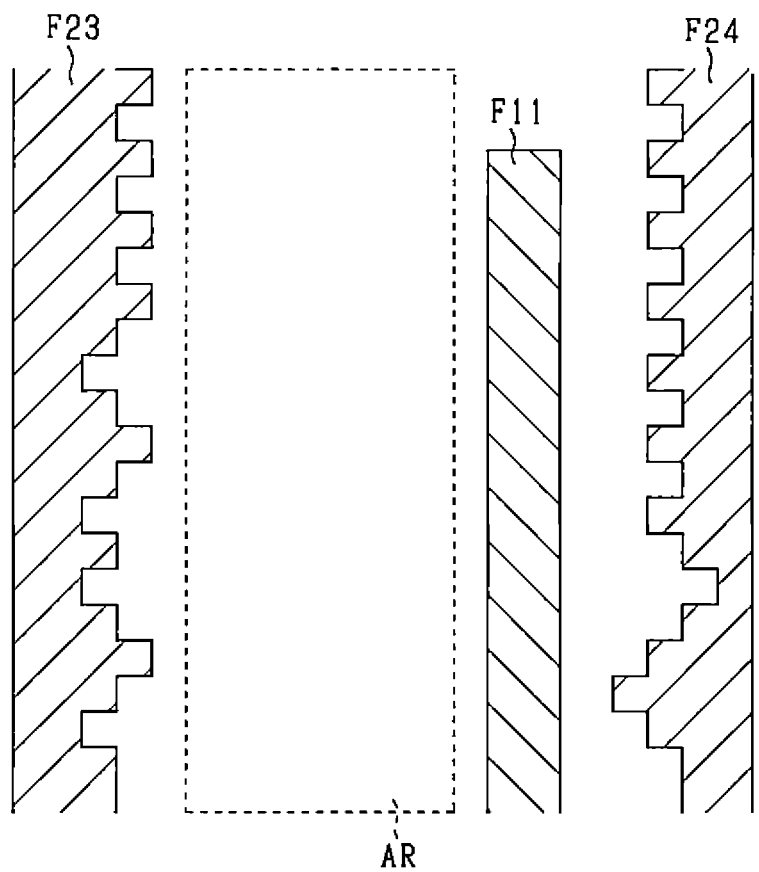
FIG. 8A is an example of travelable area estimation in the case where there is a mismatch.
Figure 8B:
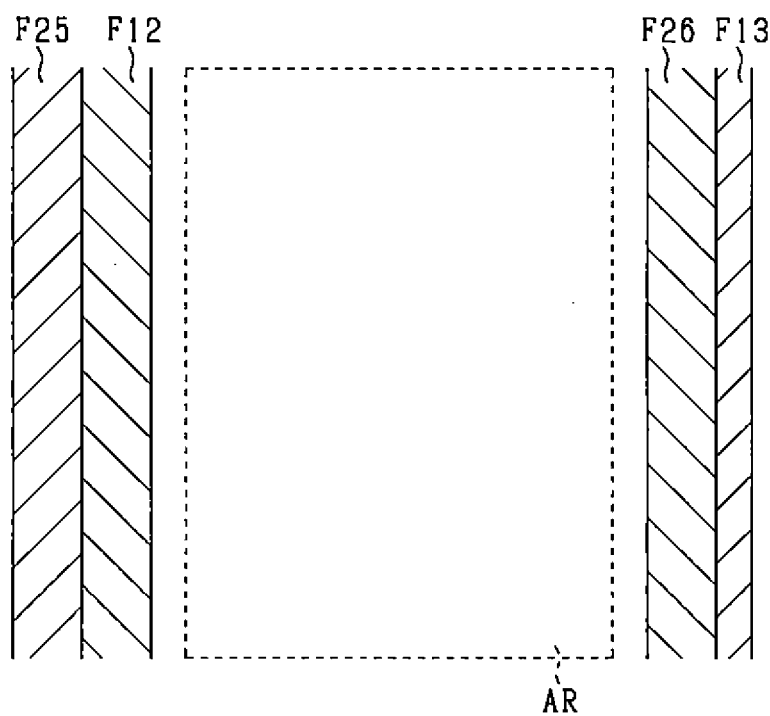
FIG. 8B is another example of travelable area estimation in the case where there is a mismatch.

FIGS. 8A and 8B illustrate examples of the fusion map MP3 generated at step S41. In each of FIGS. 8A and 8B, there are two curbs extending in the travel direction of the own vehicle. Each of the detected ground objects F23, F24, F25, F26 corresponds to a curb.

In FIG. 8A, an actually non-existing guardrail is registered in the map information MP1 as a registered ground object F11. Therefore, in the example of FIG. 8A, the ECU 30 recognizes detected ground objects F23, F24 and the registered ground object F11 as respectively different objects at step S41. In the example of FIG. 8B, a location of each of registered ground objects F12, F13 registered in the map information MP1 is shifted from a location of a respective one of the detected ground object F25, F26 in the lateral direction X. In the example of FIG. 8B, at step S41, the ECU 30 recognizes the detected ground object F25 and the registered ground object F12 as one recognition target and recognizes the sensor detected ground object 26 and the registered ground object F13 as one recognition target.

At step S42, the ECU 30 estimates a travelable area based on the recognition targets recognized at step S41. More specifically, the ECU 30 determines the recognition targets recognized from the fusion map MP3 as obstacles, and estimates an area forward of the own vehicle minus areas determined as the obstacles, as a travelable area. In the example of FIG. 8A, the ECU 30 estimates a travelable area AR such that the own vehicle can travel while avoiding the detected ground objects F23 and F24 and the registered ground object F11. In the example of FIG. 8B, the ECU 30 estimates a travelable area AR such that the own vehicle can travel while avoiding a united area of the detected ground object F25 and the registered ground object F12 and a united area of the detected ground object F26 and the registered ground object F13. Therefore, the travelable area estimated at step S42 is an area estimated from a fusion of the map information MP1 with the measurement point information MP2.

Returning to FIG. 7, at step S43 the ECU 30 provides to the external server a notification that there is a mismatch between the map information MP1 and the measurement point information MP2. For example, the ECU 30 may download the most recent map information MP1 from the external server.

At step S44, the ECU 30 requests the driver of the own vehicle to switch from automatic driving to manual driving. For example, the ECU 30 may cause the display device 45 to display an image requesting switching from automatic driving to manual driving. Looking at the image displayed on the display device 45, the driver can determine that he or she is requested to switch from automatic driving to manual driving.

At step S45 the ECU 30 reduces a speed of the own vehicle. If there is a mismatch between the map information MP1 and the measurement point information MP2, the estimated travelable area may not avoid a location of the actual recognition target. To continue automatic driving until the driver of the own vehicle switches from automatic driving to manual driving, the ECU 30 reduces a collision probability of the own vehicle with the obstacle by reducing the speed of the own vehicle. For example, each time the processing shown in FIG. 7 is performed, the ECU 30 gradually reduces the speed of the own-vehicle.

In FIG. 1B, the control aspect changer 302 is responsible for executing step S41, S42, S43, S45.

Returning to FIG. 4, at step S23, the ECU 30 determines whether or not the driver has switched from automatic driving to manual driving. For example, an input signal may be input to the ECU 30 by the driver manipulating the console 44. Upon receipt the input signal, the ECU 30 can determine that the driver has switched from automatic driving to manual driving.

If the ECU 30 determines that the driver has not switched from automatic driving to manual driving, the process flow of FIG. 4 ends. If the ECU 30 determines that the driver has switched from automatic driving to manual driving, then at step S24 the ECU 30 prohibits switching from manual driving to automatic driving. This is because, in a situation where there is a mismatch between the map information MP1 and the measurement point information MP2, it is not desirable to switch back from manual driving to automatic driving.

In the FIG. 1B, the switching prohibitor 308 is responsible for executing step S24.

FIG. 9A is a timing diagram illustrating the progression in time for automatic driving. FIG. 9B is a timing diagram illustrating the progression in time for manual driving. FIG. 9C is a timing diagram illustrating the progression in time for determination as to whether or not there is a mismatch. FIG. 9D is a timing diagram illustrating the progression in time for switching from automatic driving to manual driving. FIG. 9E is a timing diagram illustrating the progression in time for failure processing.

At time t0, automatic driving has been selected by the driver, where the own vehicle is automatically driven. At time t1, it is determined that there is a mismatch between the map information MP1 and the measurement point information MP2. The failure processing is initiated at time t1 to continue automatic driving.

At time t2, the failure processing is terminated by the driver inputting the input signal for switching. The failure processing is continued for a time period of Tf=(t1–t2) from when it is determined that there is a mismatch between the map information MP1 and the measurement point information MP2 to when the driver switches from automatic driving to manual driving. At time t3, automatic driving is terminated and manual driving by the driver is initiated.

As described above, in the present embodiment, if, during automatic driving control, the ECU 30 determines that there is a mismatch between the map information MP1 and the measurement point information MP2, the ECU 30 changes the control aspect of automatic driving control in response to a situation of mismatch. In such a case, even if there is a mismatch between the map information MP1 and the measurement point information MP2, the control aspect of automatic driving control is changed in response to a situation of mismatch between the map information MP1 and the measurement point information MP2, and automatic driving control is thereby continued. This configuration allows for properly performing automatic driving control of the own vehicle.

(A1) The ECU 30 is configured to, if, during automatic driving control, it is determined that there is a mismatch between the map information MP1 and the measurement point information MP2, request the driver of the own vehicle to switch from automatic driving to manual driving, and during a time period from when the driver is requested to switch from automatic driving to manual driving to when the driver initiates manual driving, change a control aspect of automatic driving control. With this configuration, if, during automatic driving control, it is determined that there is a mismatch between the map information MP1 and the measurement point information MP2, and the driver is requested of the own vehicle to switch from automatic driving to manual driving, then a control aspect of automatic driving control is changed, which allows the own vehicle to be driven properly even if switching from automatic driving to manual driving is actually time-consuming.

(A2) The ECU 30 is configured to, during automatic driving control, recognize a detected ground object F2 around the own vehicle from the map information MP1 and the measurement point information MP2, and based on the recognition result, control the behavior of the own vehicle. The ECU 30 makes it easier to recognize a ground object as compared to the case where it is determined that there is a match between the map information MP1 and the measurement point information MP2, thereby changing the control aspect of automatic driving control. In the case where, during automatic driving control, there is a mismatch between the map information MP1 and the measurement point information MP2, it is made easier to recognize a recognition target around the own vehicle as compared to the case where there is a match between the map information MP1 and the measurement point information MP2, which can prevent misrecognizing a recognition target even if there is a defect in at least one of the map information MP1 and the on-board sensors 10. This allows for properly controlling the behavior of the own vehicle.

(A3) The ECU 30 is configured to, if it is determined that there is a match between the map information MP1 and the measurement point information MP2, recognize a recognition target from the measurement point information MP2, and based on the recognition result, control the behavior of the own vehicle. The ECU 30 is configured to, if it is determined that there is a mismatch between the map information MP1 and the measurement point information MP2, recognize a recognition target using the the map information MP1 and the measurement point information MP2 as a unit, and based on the recognition result, control the behavior of the own vehicle. With this configuration, in the case where there is a mismatch between the map information MP1 and the measurement point information MP2, it is made easier to recognize a ground object around the own vehicle, thereby prioritizing preventing recognition errors of the ground object. This allows for properly controlling the behavior of the own vehicle even in a situation where there is a mismatch between the map information MP1 and the measurement point information MP2.

(A4) The ECU 30 is configured to, after switching from automatic driving to manual driving has been performed with determination of the mismatch between the map information MP1 and the measurement point information MP2, prohibit switching from manual driving to automatic driving. This configuration can prevent automatic driving control from being performed again in a situation where automatic driving control may not be properly performed.

Second Embodiment

A second embodiment will now be described. The basic configuration of the second embodiment is similar to that of the first embodiment. Therefore, only differences of the second embodiment from the first embodiment will be described and description about the common configuration between the first and second embodiments is not provided in order to avoid repetition.

Figure 10A:
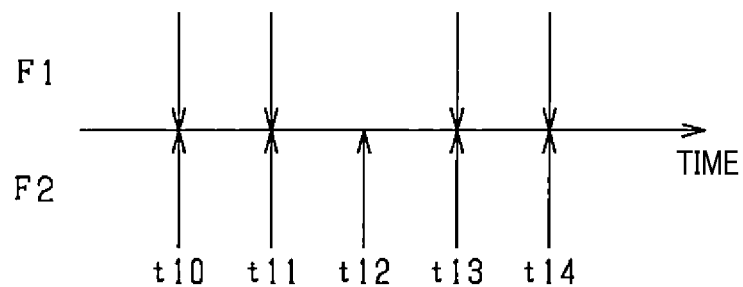
FIG. 10A is an example of a mismatch between map information MP1 and measurement point information MP2.
Figure 10B:
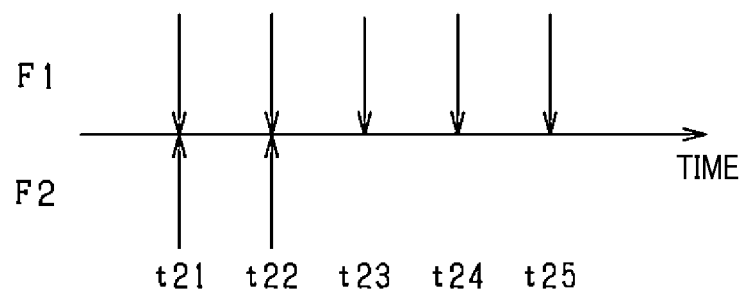
FIG. 10B is another example of a mismatch between map information MP1 and measurement point information MP2.

FIG. 10A illustrates extraction timing sequences for ground objects F1, F2 in the case where a mismatch between the map information MP1 and the measurement point information MP2 is attributed to the map information MP1. FIG. 10B illustrates extraction timing sequences for ground objects F1, F2 in the case where a mismatch between the map information MP1 and the measurement point information MP2 is attributed to the on-board sensors. In FIGS. 10A and 10B, extraction timings for the registered ground object F1 and the detected ground object F2 deemed as the same object are indicated by arrows. The extraction timing for the registered ground object F1 is indicated by downward arrows. The extraction timing for the detected ground object F2 is indicated by upward arrows. As long as there is no mismatch between the map information MP1 and the measurement point information MP2, the upward and downward arrows face each other at the same time.

The map information MP1 may be different from the actual road condition due to a road modification in part of the travel path. In the case where a mismatch between the map information MP1 and the measurement point information MP2 is attributed to the map information MP1, such a mismatch may occur temporarily in a time series. In the example of FIG. 10A, the map information MP1 and the measurement point information MP2 match at time t11, do not match at time t12, and then match at time t13.

In the case where a mismatch between the map information MP1 and the measurement point information MP2 is attributed to the on-board sensors 10, such a mismatch may continue for a long time. In the example of FIG. 10B, the mismatch continues even after time t22.

Taking into account such a time series variation in mismatch, the cause of mismatch between the map information MP1 and the measurement point information MP2 can be determined properly. This allows for properly controlling automatic driving control in response to a cause of the mismatch.

Figure 11:
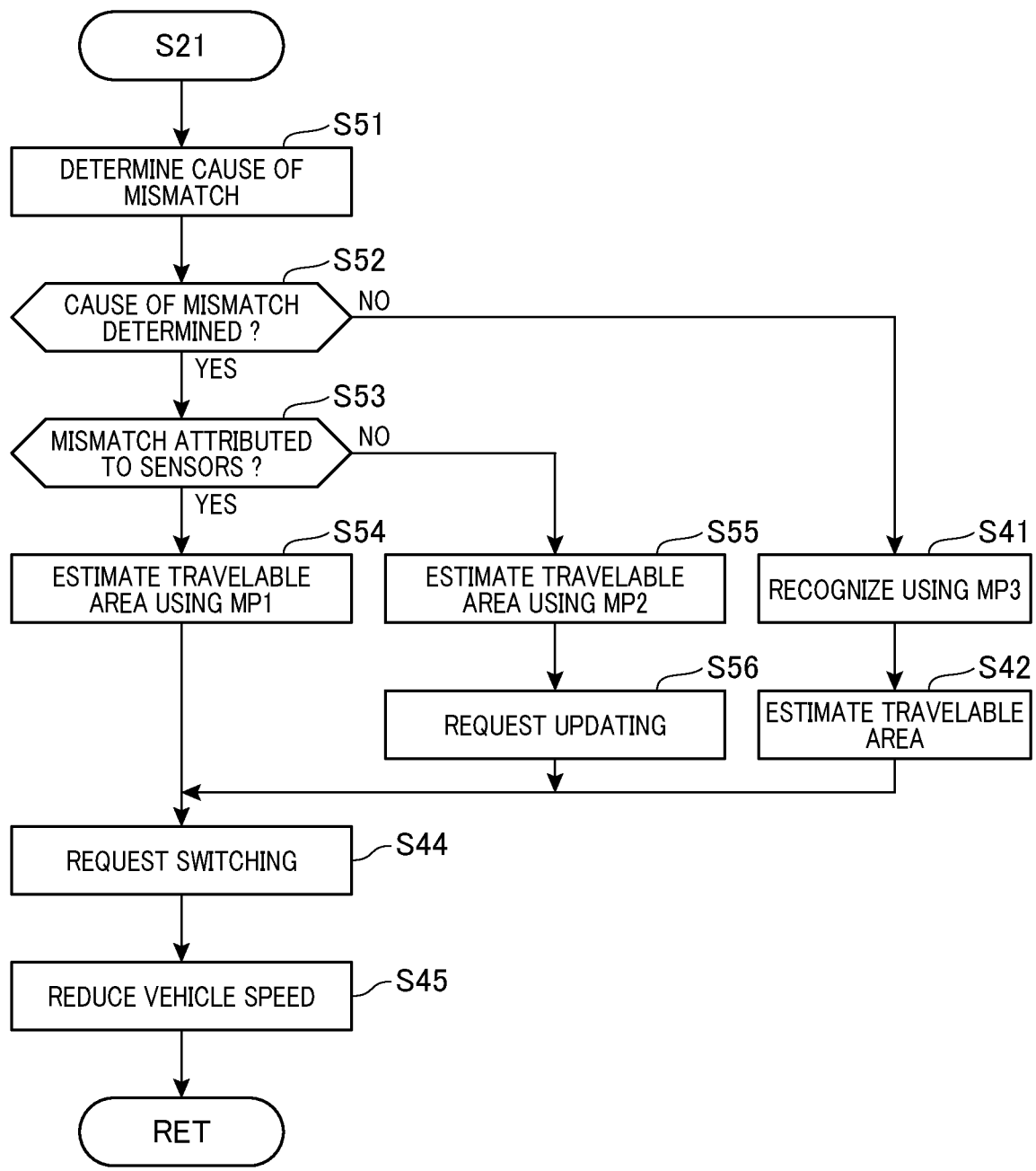
FIG. 11 is a flowchart of failure processing in accordance with a second embodiment.

FIG. 11 is a flowchart of failure processing performed by the ECU 30 in accordance with the second embodiment. This failure processing corresponds to step S21 in the flowchart of FIG. 4.

At step S51, based on a time series variation in mismatch, the ECU 30 determines whether the mismatch is attributed to the map information MP1 or the on-board sensors 10. For example, the ECU 30 monitors a duration for which the mismatch determination is continued, and compares the duration with first and second predetermined decision times T1, T2 to determine a cause of the mismatch. If the duration is greater than the first decision time T1 and less than the second decision time T2, the mismatch is attributed to the map information MP1. If the duration is greater than the second decision time T2, the mismatch is attributed to the on-board sensors 10.

The second decision time T2 may be set based on an amount of time taken for the own vehicle to pass through a road construction zone under assumption that road construction or the like is being undertaken. More specifically, the second decision time T2 may be set assuming that the own vehicle travels at a predetermined speed (for example, a legal speed) in a road construction zone of tens to hundreds of meters. The first decision time T1 may be less than the second decision time T2.

In FIG. 1B, the cause-of-mismatch determiner 304 is responsible for execution of step S51.

At step S52, the ECU 30 determines whether or not a cause of the mismatch has been determined. If a cause of the mismatch has been determined, then the process flow proceeds to step S53. At step S53, the ECU 30 determines whether the mismatch is attributed to the on-board sensors 10.

If at step S53 it is determined that the mismatch is attributed to the on-board sensors 10, the process flow proceeds to step S54. At step S54, the ECU 30 estimates a travelable area using the map information MP1. In such a case, the mismatch is likely to be attributed to the on-board sensors 10. Therefore, not the measurement point information MP2, but the map information MP1 is used to estimate a travelable area.

If at step S53 it is determined that the mismatch is attributed not to the on-board sensors 10, but to map information MP1, the process flow proceeds to step S55. At step S55, the measurement point information MP2 is used to estimate a travelable area. In such a case, the mismatch is likely to be attributed to the map information MP1. Therefore, not the map information MP1, but the measurement point information MP2 is used to estimate a travelable area.

At step S56, the ECU 3 requests the external server to update the map information. This is because updating the map information MP1 is likely to eliminate the mismatch between the map information MP1 and the measurement point information MP2.

If at step S52 a cause of the mismatch has not been determined, then the process flow proceeds to step S41. This may be the case if the duration is equal to or less than the first decision time T1. At step S41, both the map information MP1 and the measurement point information MP2 are used to recognize a recognition target. In the present embodiment, the fusion map MP3 is generated and the fusion map MP3 is used to recognize a recognition target.

At step S42, the ECU 30 estimates a travelable area using the recognition target recognized at step S41. After steps S44, S45 are performed, the process flow of FIG. 11 ends.

As described above, in the present embodiment, the ECU 30 is configured to, if, during automatic driving control, it is determined that there is a mismatch between the map information MP1 and the measurement point information MP2, then based on a time series variation in mismatch, determine whether the mismatch is attributed to the map information MP1 or the on-board sensors 10. The ECU 30 is configured to, based on the determination result, change a control aspect of automatic driving control. In such a case, a time series variation in mismatch makes it possible to properly determine a cause of mismatch the map information MP1 and the measurement point information MP2. This allows for properly controlling automatic driving control in response to the cause of the mismatch.

(A5) The ECU 30 is configured to, if a cause of the mismatch has not been determined, perform automatic driving control using both the map information MP1 and the measurement point information MP2, and if a cause of the mismatch has been determined, perform automatic driving control using one of the map information MP1 and the measurement point information MP2, to which the mismatch is not attributed. With this configuration, if a cause of the mismatch between the map information MP1 and the measurement point information MP2 has not been determined, automatic driving control is performed using the map information MP1 and the measurement point information MP2. This can prioritize preventing recognition errors of a recognition target. If a cause of the mismatch between the map information MP1 and the measurement point information MP2 has been determined, automatic driving control is performed using one of the map information MP1 and the measurement point information MP2, to which the mismatch is not attributed. Non-use of incorrect information can lead to increased reliability of automatic driving control.

Third Embodiment

A third embodiment will now be described. The basic configuration of the third embodiment is similar to that of the second embodiment. Therefore, only differences of the third embodiment from the second embodiment will be described and description about the common configuration between the third and second embodiments is not provided in order to avoid repetition.

During manual driving, the own vehicle is driven to avoid a recognition target based on a driver's gaze. Therefore, a travel path during manual driving can be deemed as properly taking into account a recognition target around the own vehicle. In the third embodiment, the ECU 30 is configured to, after switching from automatic driving to manual driving caused by a mismatch decision made by the ECU 30, determine a cause of a mismatch using an avoidance behavior during manual driving.

FIG. 12 is a flowchart of processing performed by the ECU 30 to determine a cause of a mismatch during manual driving. This processing is initiated by the ECU 30 upon the driver switching from automatic driving to manual driving and then performed by the ECU 30 every predetermined time interval.

At step S60, the ECU 30 acquires information about own-vehicle's behavior manipulation by the driver (hereinafter referred to as behavior manipulation information). In the present embodiment, at step S60, the ECU 30 acquires, as the behavior manipulation information, manipulation information generated by the steering device 42 upon the driver operating a steering wheel of the own vehicle.

In FIG. 1B, the behavior manipulation information acquirer 305 is responsible for execution of step S60.

At step S61, the ECU 30 determines whether or not switching from automatic driving to manual driving has been performed. If at step S61 it is determined that switching from automatic driving to manual driving has been performed, then the process flow proceeds to step S62. For example, if at step S23 shown in FIG. 4 it is determined that switching from automatic driving to manual driving has been performed, then the process flow proceeds to step S62. If at step S23 shown in FIG. 4 it is determined that switching from automatic driving to manual driving has not been performed, then the process flow of FIG. 12 ends.

At step S62, the ECU 30 determines whether or not the mismatch is attributed to the on-board sensors 10. If at step S53 in FIG. 11 it is determined that the mismatch is attributed to the on-board sensors 10, then the process flow proceeds to step S63.

At step S63, the ECU 30 determines whether or not the behavior of the own vehicle during manual driving by the driver is reflecting the detected ground object F2. For example, if the own vehicle is traveling to avoid the detected ground object F2 based on the behavior manipulation information acquired at step S60, then the ECU 30 determines that the behavior of the own vehicle during manual driving by the driver is reflecting the measurement point information MP2. For example, if a distance from the own vehicle to the detected ground object F2 is increased in either a travel direction Y or a lateral direction X by controlling the behavior of the own vehicle to avoid the detected ground object F2, the ECU 30 may determine that the behavior of the own vehicle during manual driving by the driver is reflecting the detected ground object F2.

If at step S63 the ECU 30 determines that the behavior of the own vehicle during manual driving is reflecting the detected ground object F2, then at step S64 the ECU 30 permits the driver of the own vehicle to return to automatic driving. This is because, in this case, an accurate determination using the behavior of the own vehicle during manual driving allows for determining that the on-board sensors 10 are operating normally. If at step S63 the ECU 30 determines that the behavior of the own vehicle during manual driving is not reflecting the detected ground object F2, then the process flow ends without permitting the driver of the own vehicle to return to automatic driving.

If at step S62 it is determined that the mismatch is not attributed to the on-board sensors 10, then the process flow proceeds to step S65. At step S65, the ECU 30 determines whether or not the mismatch is attributed to the map information MP1. For example, if at step S53 in FIG. 11 it is determined that the mismatch is attributed to the map information MP1, then the process flow proceeds to step S66.

At step S66, the ECU 30 determines whether or not the behavior of the own vehicle during manual driving by the driver is reflecting the registered ground object F1. For example, if the own vehicle is traveling to avoid the registered ground object F1 based on the behavior manipulation information acquired at step S60, then the ECU 30 determines that the behavior of the own vehicle during manual driving by the driver is reflecting the map information MP1. For example, if a distance from the own vehicle to the registered ground object F1 is increased in either the travel direction Y or the lateral direction X by controlling the behavior of the own vehicle to avoid the registered ground object F1, the ECU 30 may determine that the behavior of the own vehicle during manual driving by the driver is reflecting the registered ground object F1.

If at step S66 the ECU 30 determines that the behavior of the own vehicle during manual driving is reflecting the registered ground object F1, then at step S67 the ECU 30 permits the driver of the own vehicle to return to automatic driving. This is because, in this case, the map information MP1 is determined to be accurate. If at step S66 the ECU 30 determines that the behavior of the own vehicle during manual driving is not reflecting the registered ground object F1, then the process flow ends without permitting the driver of the own vehicle to return to automatic driving.

In FIG. 1B, the return permitter 306 is responsible for executing steps S64, S67, and the after-switching determiner 307 is responsible for executing steps S61-S63, S65, S66.

If at step S65 the ECU 30 determines that the mismatch is attributed to none of the map information MP1 and the on-board sensors 10, then the process flow of FIG. 12 ends. This may be the case if at step S52 of FIG. 11 a cause of the mismatch has not been determined. In some embodiments, the ECU 30 may, after performing step S66, compare whether the behavior of the own vehicle during manual driving is reflecting the registered ground object F1 or the detected ground object F2.

As described above, in the present embodiment, the ECU 30 is configured to, if switching from automatic driving to manual driving has been performed by the driver in response to the request caused by the mismatch decision, acquire information about the behavior manipulation by the driver. The ECU 30 is configured to compare the acquired behavior manipulation information and one of the map information MP1 and the measurement point information MP2, to which the mismatch is attributed, and if there is a match between the acquired behavior manipulation information and the one of the map information MP1 and the measurement point information MP2, permit the driver to return to automatic driving. This configuration allows for post-determining whether or not the mismatch decision was correct via a driver's gaze, which can prevent automatic driving from being inadvertently prohibited.

The ECU 30 is configured to, if switching from automatic driving to manual driving has been performed by the driver in response to a mismatch decision, acquire information about the behavior manipulation by the driver. The ECU 30 is configured to compare the acquired behavior manipulation information and the map information MP1 and the measurement point information MP2 to determine to which one of the map information MP1 and the measurement point information MP2 the mismatch is attributed. In this configuration, use of a driver's gaze to determine a cause of the mismatch allows for accurately determining to which one of the map information MP1 and the on-board sensors 10 the mismatch is attributed.

Modifications (M1) In the third embodiment, the ECU 30 is configured to, after switching from automatic driving to manual driving has been performed by the driver in the case where there is a mismatch between the map information MP1 and the measurement point information MP2, compare the behavior manipulation information and one of the map information MP1 and the measurement point information MP2, to which the mismatch is determined to be attributed before switching from automatic driving to manual driving. In an alternative embodiment, the ECU 30 may be configured to, if it is determined during automatic driving control that there is a mismatch between the map information MP1 and the measurement point information MP2 and then switching from automatic driving to manual driving has been performed without determining a cause of the mismatch, compare the behavior manipulation information and each one of the map information MP1 and the measurement point information MP2, and determine to which one of the map information MP1 and the measurement point information MP2 the mismatch is attributed.

(M2) In one alternative embodiment, the ECU 30 may be configured to, if it is determined during automatic driving control that there is a match between the map information MP1 and the measurement point information MP2, recognize a recognition target using both the map information MP1 and the measurement point information MP2. In such an embodiment, the ECU 30 may be configured to recognize a recognition target upon the condition that both the registered ground object F1 and the detected ground object F2 have been extracted, which can improve the reliability of the recognition target.

(M3) In one alternative embodiment, the ECU 30 may be configured to, if it is determined during automatic driving control that there is a match between the map information MP1 and the measurement point information MP2, recognize a recognition target based on registered ground objects F1 registered in the map information MP1.

(M4) In one alternative embodiment, the ECU 30 may be configured to, if it is determined during automatic driving control that there is a mismatch between the map information MP1 and the measurement point information MP2, reduce the existence probability for each of blocks recognized as a recognition target as compared with the case where it is determined during automatic driving control that there is a match between the map information MP1 and the measurement point information MP2. In such an embodiment, when recognizing a recognition target from the measurement point information MP2 in the failure processing performed at step S21 of FIG. 4, the recognition target may be recognized using a decision threshold less than the decision threshold used to extract a detected ground object F2.

(M5) In one alternative embodiment, the on-board sensors 10 of the vehicle control system 100 may only include the radar device 12 and the laser device 13, instead of including the imaging device 11, the radar device 12, and the laser device 13.

(M6) In one alternative embodiment, the ECU 30 may be configured to control the behavior of the own vehicle using a location of a recognition target recognized using the range data and image data received from the imaging device 11 together. In such an embodiment, the ECU 30 may be configured to recognize demarcation lines that define the own lane acquired from the image data, which is a lane in which the own vehicle is traveling, set the center line of the own lane of the own vehicle based on the demarcation lines as a target lateral position of the own vehicle, and using the location of the recognition target and the target lateral position of the own vehicle, control the behavior of the own vehicle.

What is claimed is:

1. A vehicle control apparatus for performing automatic driving control of a vehicle equipped with the vehicle control apparatus, the vehicle control apparatus comprising:
   a non-transitory memory storing one or more computer programs;
   a processor executing the one or more computer programs to:
   during automatic driving control, determine whether or not there is a match between map information and detection information, the detection information being information about surroundings of the vehicle detected by sensors mounted to the vehicle;
   in response to determining that there is a mismatch between the map information and the detection information, make a cause-of-mismatch determination as to whether the mismatch is attributed to either the map information or the detection information, based on a time series variation in mismatch;
   in response to a cause of the mismatch being not determined, fuse information about ground objects extracted from the detection information with information about ground objects extracted from the map information to generate a fusion map depending on a situation of the mismatch, and perform automatic driving control of the vehicle based on the fusion map; and
   in response to a cause of the mismatch being determined, perform automatic driving control based on one of the map information and the detection information, to which the mismatch is not attributed, thereby changing a control aspect of automatic driving control.

2. The vehicle control apparatus according to claim 1, wherein
   the processor further executes one or more programs to, in response to determining that there is a mismatch between the map information and the detection information, request a driver of the vehicle to make a switch from automatic driving to manual driving, and during a time period from when the driver is requested to make a switch from automatic driving to manual driving to when the driver initiates manual driving, change the control aspect of automatic driving control.

3. The vehicle control apparatus according to claim 1, wherein
   the processor further executes one or more programs to, in response to determining that there is a match between the map information and the detection information, recognize a presence of a target based a prescribed one of the map information and the detection information from the sensors.

4. The vehicle control apparatus according to claim 1, wherein the processor further executes one or more programs to, in response to determining that there is a mismatch between the map information and the detection information, request a driver of the vehicle to make a switch from automatic driving to manual driving,
   after the driver making the switch from automatic driving to manual driving in response to the request, acquire information about a vehicle's behavior manipulation by the driver, and
   compare the information about the vehicle's behavior manipulation by the driver and one of the map information and the detection information, to which the mismatch is attributed, and in response to determining that there is a match between the information about the vehicle's behavior manipulation by the driver and the one of the map information and the detection information, permit the driver to return to automatic driving.

5. The vehicle control apparatus according to claim 1, wherein the processor further executes one or more programs to, in response to determining that there is a mismatch between the map information and the detection information, request a driver of the vehicle to make a switch from automatic driving to manual driving, and prohibit the driver from making a switch from manual driving to automatic driving after the driver making the switch from automatic driving to manual driving.

6. The vehicle control apparatus according to claim 1, wherein
the processor further executes one or more programs to, in response to determining that there is a mismatch between the map information and the detection information, change the control aspect of automatic driving control to further reduce a speed of the vehicle.

7. A vehicle control apparatus for performing automatic driving control of a vehicle equipped with the vehicle control apparatus, the vehicle control apparatus comprising:
a non-transitory memory storing one or more computer programs;
a processor executing the one or more programs to:
during automatic driving control, determine whether or not there is a match between map information and detection information, the detection information being information about surroundings of the vehicle detected by sensors mounted to the vehicle;
in response to determining that there is a mismatch between the map information and the detection information, fuse information about ground objects extracted from the detection information with information about ground objects extracted from the map information to generate a fusion map depending on a situation of the mismatch, and change a control aspect of automatic driving control to perform automatic driving control of the vehicle based on fusion map;
in response to determining that there is a mismatch between the map information and the detection information, request a driver of the vehicle to make a switch from automatic driving to manual driving;
after the driver making the switch from automatic driving to manual driving in response to the request, acquire information about a vehicle's behavior manipulation by the driver;
compare the information about the vehicle's behavior manipulation by the driver with the map information and the detection information, and based on a result of comparison, make a cause-of-mismatch determination as to whether the mismatch is attributed to either the map information or the detection information; and
compare the information about the vehicle's behavior manipulation by the driver and one of the map information and the detection information, to which the mismatch is attributed, and in response to determining that there is a match between the information about the vehicle's behavior, manipulation by the driver and the one of the map information and the detection information, permit the driver to return to automatic driving.

8. A vehicle control method for performing automatic driving control of a vehicle, the vehicle control method comprising:
determining, during automatic driving control, whether or not there is a match between map information and detection information, the detection information being information about surroundings of the vehicle detected by sensors mounted to the vehicle;
in response to determining that there is a mismatch between the map information and the detection information, changing a control aspect of automatic driving control to make a cause-of-mismatch determination as to whether the mismatch is attributed to either the map information or the detection information, based on a time series variation in mismatch;
in response to a cause of the mismatch being not determined, fuse information about ground objects extracted from the detection information with information about ground objects extracted from the map information to generate a fusion map depending on a situation of the mismatch, and perform automatic driving control of the vehicle based on the fusion map; and
in response to a cause of the mismatch being determined, perform automatic driving control based on one of the map information and the detection information, to which the mismatch is not attributed.

* * * * *